UNITED STATES PATENT OFFICE.

ARTHUR HOUGH, OF CHOISY, QUEBEC, CANADA.

PROCESS OF MAKING GLYCOL DINITRATE FOR EXPLOSIVE USES.

1,206,223.  Specification of Letters Patent.  Patented Nov. 28, 1916.

No Drawing.   Application filed October 22, 1914.  Serial No. 868,115.

*To all whom it may concern:*

Be it known that I, ARTHUR HOUGH, a subject of the King of Great Britain, and a resident of Choisy, Province of Quebec, Canada, have invented certain new and useful Improvements in the Process of Making Glycol Dinitrate for Explosive Uses, of which the following is a specification.

My invention relates to the manufacture of glycol dinitrate for explosive uses and its object is primarily to provide a practical process for such manufacture, said process utilizing glycol as the starting material and producing a relatively pure and stable product of large yield.

In accordance with my process the glycol is nitrated by a nitrating mixture comprising nitric acid, sulfuric acid and water. I have found that if there is either too little water or too much water in the mixture, a mono-nitrate is obtained and that for making dinitrate, the acids and water must be present within certain proportional limits which can be expressed by stating that the total weight of acids must be not greater than 96% of the whole weight of the nitrating mixture and not less than 93% of the whole weight, the best acidity being in the neighborhood of 95%. I have also found that the nitric acid must be present in certain amounts in order to get the most efficient yields, because the glycol dinitrate produced is soluble in sulfuric acid, and to prevent the loss of this dissolved product there must be provided an excess of the nitric acid over that which combines with the glycol, the product being substantially insoluble in the mixture of such excess nitric acid with sulfuric acid. A suitable nitrating mixture, made in accordance with my invention, contains between 35% and 36% nitric acid and 58% and 59% sulfuric acid. The best ratio between the parts by weight of mixture to the parts by weight of glycol, for the nitration, has been found to be about 7 to 1.

When, for example, one part of glycol is added to seven parts of a mixture of 35.1% nitric acid, 59% sulfuric acid and 5.85% water (and .05% nitrous acid); the nitration temperature being 13° C., a yield of 2.41 parts glycol dinitrate is obtained; .08% of glycol dinitrate is lost by being dissolved in the spent acids; by a heat test at 72° C., of the product it was found that 16 minutes were necessary before the beginning of decomposition was indicated.

Another example of nitrating mixture consists of 36% nitric acid, 58% sulfuric acid and 5.9% water (and .1% nitrous acid). When seven parts of this mixture have been reacted upon by one part of glycol at 12° C., a yield of 2.405 parts glycol dinitrate is obtained; .09% of the product was dissolved in the spent acids; the heat test showed the same results as in the first example.

When the nitration has been completed the whole charge may be drowned in a large quantity of water and the glycol dinitrate will fall to the bottom of the vessel in the form of a heavy oily liquid. The acids are removed preferably by washing the liquid thoroughly with water and then with sodium carbonate solution and finally with water at about 20°, C. The product thus obtained is a slightly yellowish oily liquid of specific gravity 1.489. Theoretically one part of glycol will produce 2.451 parts of dinitrate; practically, however, the yield is about 2.35 parts of dinitrate for each part of glycol.

The glycol dinitrate may be enlarged in its usefulness for explosive uses by incorporating it with a suitable solidifying agent, whereby a solid explosive composition is produced. For instance, it may be used as a solvent for nitro-cellulose for producing a gelatin dynamite or may be incorporated with a suitable absorbent vehicle, such for example, as 55 parts sodium nitrate, 9 parts dry starch, 5 parts wood meal, 1 part magnesium carbonate, with which vehicle 30 parts glycol dinitrate may be used. Combinations of glycol dinitrate with a vehicle of this kind, or with any other suitable vehicle, are of great practical value as explosives, having many advantages as compared with explosives of the nitro glycerin type.

It should be understood, of course, that when the acids and other agents used in my process are commercial products and are therefore more or less impure the amounts used will vary, according to the amounts of impurities, from those specified above, which are based upon chemically pure products.

I claim:

1. The process of making glycol dinitrate for explosive uses which comprises nitrating glycol with a mixture of nitric and sulfuric acids, the total weight of acids in which mixture is more than 93% but less than 96% of the weight of the whole mixture.

2. The process of making glycol dinitrate for explosive uses which comprises nitrating glycol with a mixture containing approximately 35% nitric acid and approximately 59% sulfuric acid.

3. The process of making glycol dinitrate for explosive uses which comprises nitrating glycol with a mixture containing 35 to 36% nitric acid and 58 to 59% sulfuric acid.

4. The process of making glycol dinitrate for explosive uses which comprises nitrating glycol with a mixture containing 35.1% nitric acid, 59% sulfuric acid, and 5.85% water.

5. The process of making glycol dinitrate for explosive uses which comprises adding 1 part of glycol to 7 parts of a mixture of nitric and sulfuric acids, the total weight of acids in which mixture is more than 93% but less than 96% of the weight of the whole mixture.

In witness whereof I have hereunto set my hand in the presence of two subscribing witnesses.

ARTHUR HOUGH.

Witnesses:
 JOHN A. FERGUSON,
 FRED A. KLEIN.